United States Patent
Arnez et al.

(10) Patent No.: US 7,334,233 B2
(45) Date of Patent: *Feb. 19, 2008

(54) METHOD AND APPARATUS FOR MULTIPLE SLAVES TO RECEIVE DATA FROM MULTIPLE MASTERS IN A DATA PROCESSING SYSTEM

(75) Inventors: Andreas Arnez, Schoenaich (DE); Douglas Michael Boecker, Rochester, MN (US); Stephan Otis Broyles, Austin, TX (US); Hemlata Nellimarla, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 669 days.

This patent is subject to a terminal disclaimer.

(21) Appl. No.: 10/425,396

(22) Filed: Apr. 28, 2003

(65) Prior Publication Data

US 2004/0216142 A1    Oct. 28, 2004

(51) Int. Cl.
G06F 13/00 (2006.01)
G06F 13/10 (2006.01)
G06F 13/36 (2006.01)
G06F 13/14 (2006.01)

(52) U.S. Cl. .................. 719/321; 719/324; 710/305; 710/306

(58) Field of Classification Search ............. 719/321, 719/324; 710/33, 105, 306, 305
See application file for complete search history.

(56) References Cited

U.S. PATENT DOCUMENTS 5,619,685 A * 4/1997 Schiavone ............... 703/20
6,145,036 A    11/2000 Barenys et al.
6,233,635 B1    5/2001 Son
6,338,150 B1    1/2002 Johnson et al.
6,449,289 B1 *  9/2002 Quicksall ............... 370/475
6,510,484 B1    1/2003 Kim et al.
6,516,367 B1 *  2/2003 Barenys et al. ......... 710/109
6,622,188 B1 *  9/2003 Goodwin et al. ....... 710/105
6,728,908 B1    4/2004 Fukuhara et al.
6,785,894 B1 *  8/2004 Ruberg .................. 719/321
6,810,461 B2 * 10/2004 Okazawa et al. ....... 710/306
6,907,478 B2 *  6/2005 Li et al. ..................... 710/33
6,925,349 B2 *  8/2005 Albrecht et al. ........ 700/128
7,039,734 B2 *  5/2006 Sun et al. ............... 710/110
7,127,541 B2 * 10/2006 Govindarajulu et al. ... 710/300
2004/0059852 A1   3/2004 Sun et al.
2004/0177194 A1   9/2004 Benson et al.

OTHER PUBLICATIONS

U.S. Appl. No. 10/425,440, Boecker et al., Method and Apparatus for Transferring Data to Virtual Devices Behind a Bus Expander.
U.S. Appl. No. 10/425,440, Boecker et al., Method and Apparatus for Transferring Data to Virtual Devices Behind a Bus Expander.

* cited by examiner

Primary Examiner—Li B. Zhen
(74) Attorney, Agent, or Firm—Duke W. Yee; Diana R. Gerhardt; Lisa L. B. Yociss

(57) ABSTRACT

A method, apparatus, and computer instructions for managing requests for data by processes in a data processing system. Requests for data from the processes in slave mode are tracked. Data received by a device driver is stored, wherein the data may originate from multiple masters. The data is sent to the processes, wherein the device driver is not required to handle requests for the processes in slave mode.

3 Claims, 4 Drawing Sheets

US 7,334,233 B2

METHOD AND APPARATUS FOR MULTIPLE SLAVES TO RECEIVE DATA FROM MULTIPLE MASTERS IN A DATA PROCESSING SYSTEM

CROSS REFERENCE TO RELATED APPLICATION

The present invention is related to the following application entitled "Method and Apparatus for Transferring Data to Virtual Devices Behind a Bus Expander", Ser. No. 10/425,440, filed even date hereof, assigned to the same assignee, and incorporated herein by reference.

BACKGROUND OF THE INVENTION

1. Technical Field

The present invention relates generally to an improved data processing system and in particular to a method and apparatus for processing data. Still more particularly, the present invention provides a method and apparatus for transferring data on a bus between master and slave components.

2. Description of Related Art

A bus is a common pathway, or channel, between multiple devices. The computer's internal bus is known as the local bus, or processor bus. This type of bus provides a parallel data transfer path between the CPU and main memory and to the peripheral buses. A 16-bit bus transfers two bytes at a time over 16 wires; a 32-bit bus uses 32 wires, etc. The bus is comprised of two parts: the address bus and the data bus. Addresses are sent over the address bus to signal a memory location, and the data is transferred over the data bus to that location.

Various other types of buses are used in data processing systems. In particular, an inter-internal control (IIC) bus is an example of another type of bus used in a data processing system. In this bus, one wire carries a clock signal, while another wire carries the data signal. This type of bus is used to provide interconnection between various devices, such as a flexible service processor, a memory, and a control panel. A flexible service processor is a processing unit that is used to initialize a data processing system. A flexible service processor has its own boot code and operating system and may be connected to a number of I/O devices.

Devices connected to an IIC bus may operate in a master or slave mode. In a master read/write mode, the device may initiate a data transfer. When a device is in a slave read/write mode, the device simply waits for data coming over the IIC bus. On a flexible service processor, a device driver is employed by the flexible service processor to handle data transfers with the bus. An application executing on a flexible service processor may make a call to the device driver indicating that the flexible service processor needs to respond as a slave to some event triggered by an external master. An external master is a master device located external to the flexible service processor. An example of an external master device is a control panel, which may send identifying button pushes on the panel, to the flexible service processor. Another example of an external master device is a rack power controller, which may send data, such as temperature data to the flexible service processor.

More than one master, external to the flexible service processor, may target a "virtual slave" in the flexible service processor. With this situation, more than one event may be issued by different external devices at the same time. Further, more than one process executing on the flexible service processor may be waiting for data on the same bus. A flexible service processor is the slave device and is only able to listen for data on a single slave address for a particular IIC bus. IIC buses have no intelligence regarding the identity of the master triggering the event. As a result, the bus is unable to associate data, put on data lines, with the process waiting for the data.

With this set-up, only one slave transfer request is currently possible for a device driver on a flexible service processor. If data for events are issued by different master devices, data can be lost if the flexible service processor is not continuously set up to receive any data that might be put onto the bus. For example, two applications may be executing on a flexible service processor in which one application monitors for button pushes on a control panel, while the other application monitors for temperature data from a power device, such as a rack power controller. If both the control panel and the rack power controller send data, as master devices, on the bus at the same time, the data is directed towards the flexible service processor as the slave device. This data can be received by only one of the applications because the current architecture only allows the device driver for the flexible service processor to handle only one slave request at a time. In this example, both applications cannot issue slave requests that can be handled by the device driver. As a result, a loss of information may occur.

Therefore, it would be advantageous to have an improved method, apparatus, and computer instructions for handling data transfers between external master devices and internal requests for slave transfers.

SUMMARY OF THE INVENTION

The present invention provides a method, apparatus, and computer instructions for managing requests for data by processes in a data processing system. Slave mode requests from processes are tracked. Data received by a device driver is stored, wherein the data may originate from multiple masters. The data is sent to the processes, wherein the device driver is not required to handle requests for the processes in slave mode.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
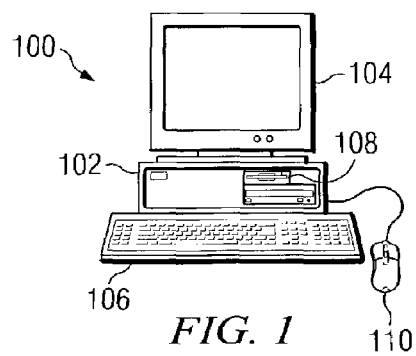
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
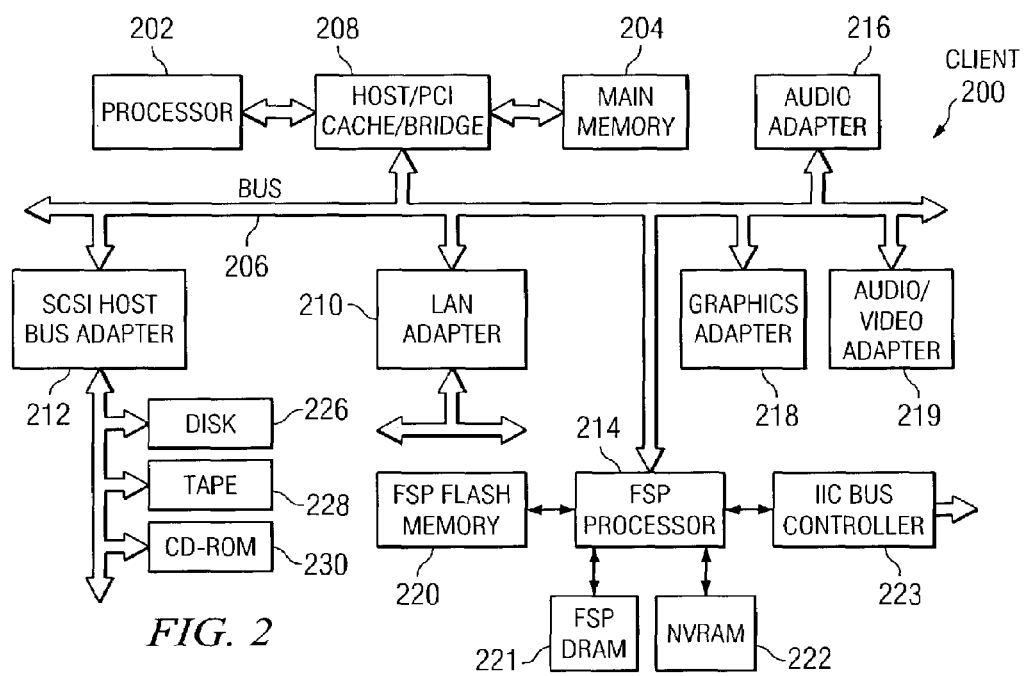
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212 and flexible service processor (FSP) processor 214 are connected to PCI local bus 206 by direct component connection. In contrast, audio adapter 216, graphics adapter 218, and audio/video adapter 219 are connected to PCI local bus 206 by add-in boards inserted into expansion slots.

FSP processor 214 is connected to FSP flash memory 220, FSP dynamic random access memory (DRAM) 221, NVRAM 222, and IIC bus controller 223. All of these components form a FSP unit or module. FSP flash memory 220 is an example of the flash memory in which microcode used for an initial program load (IPL) may be stored. FSP DRAM 221 is a memory in which LIDs or microcode from FSP flash memory 220 are loaded for execution by FSP processor 214. NVRAM 222 may be used to hold data that is to be retained when the system is powered down. IIC bus controller 223 provides an interface to devices, such as a memory, a control panel, and a power device.

SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
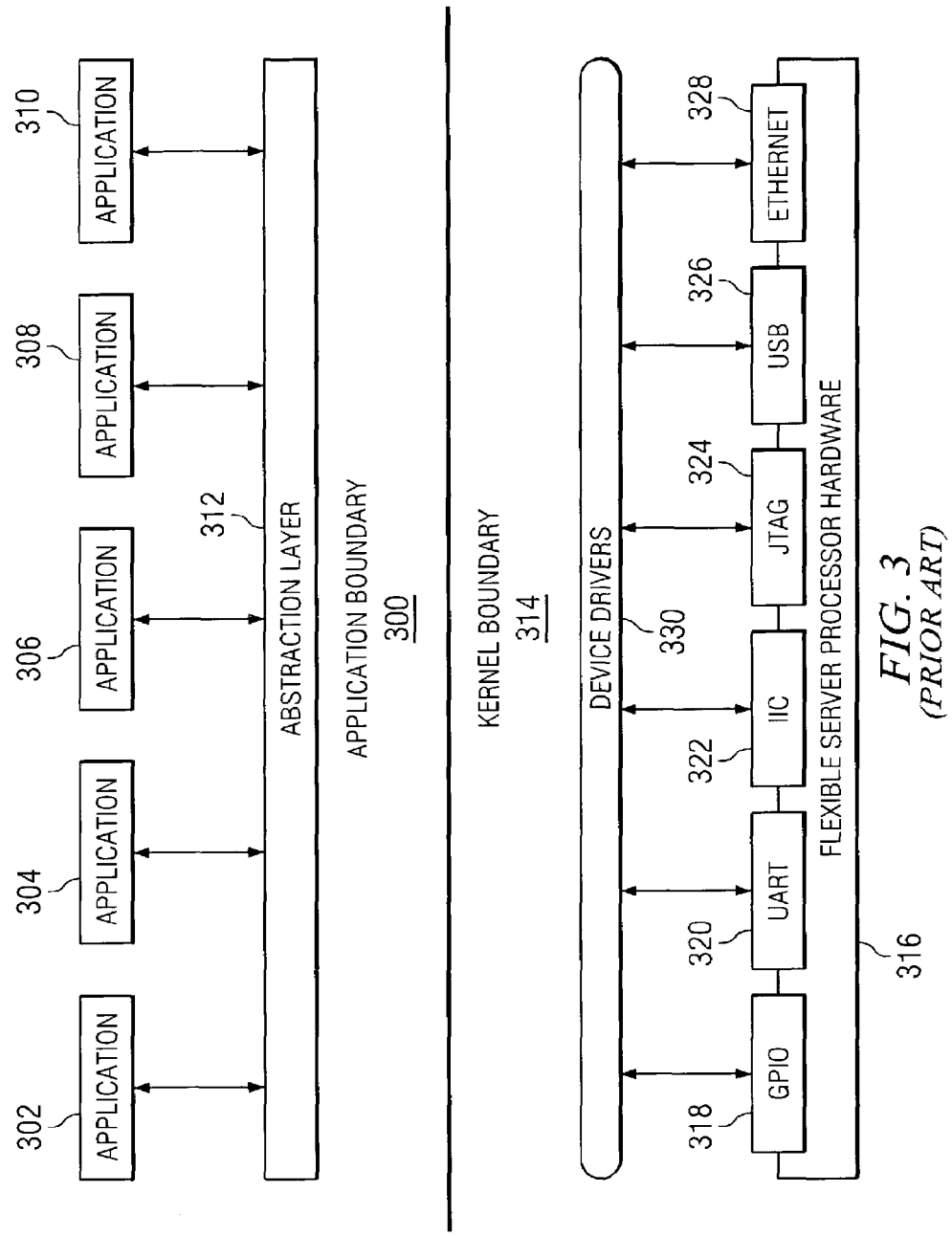
FIG. 3 is a block diagram illustrating functional components used in transferring data between devices.

Turning next to FIG. 3, a block diagram illustrating functional components used in transferring data between devices is illustrated. In this example, application boundary 300 includes applications 302, 304, 306, 308, and 310, which may call services through extraction layer 312. Abstraction layer 312 serves as a router for all requests from the different applications. Kernel boundary 314 contains flexible service processor hardware 316, which may be accessed through different media, such as general purpose input/output (GPIO) 318, universal asynchronous receiver transmitter (UART) 320, inter-internal control (IIC) 322, joint test action group (JTAG) 324, universal serial bus (USB) 326, and Ethernet 328. Device drivers 330 provide an interface for the physical devices in flexible service processor hardware 316.

In these examples, a device driver is present for IIC 322. Presently available device drivers are only able to handle a single slave request at any one time for a particular IIC bus. Thus, if multiple devices are sending messages to a flexible service processor on the same bus, some of the data may be lost because the currently available device driver is only able to handle a single slave request at a time. In other words, only a single application or process on the flexible service processor is able to receive data for that IIC bus.

The present invention provides a method, apparatus, and computer instructions for allowing multiple slave requests to be handled at the same time in a flexible service processor system. The mechanism of the present invention buffers data received by the device driver by the IIC bus. Additionally, the mechanism insures that the flexible service processor is always ready to receive and respond to events triggered by external entities, such as "external master devices". In this manner, the mechanism of the present invention avoids the loss of data. Further, buffering of incoming data eliminates the need for message data, identifying the master transmitting the message, the mechanism of the present invention allows all of the virtual slaves in the flexible service processor to see the message.

This mechanism virtualizes applications as slaves. One physical slave exists, the flexible service processor, in these examples. The virtual slaves are processes or applications executing on the flexible service processor. The device driver is not required to handle more than one slave request. In these examples, the slave request is managed by a abstraction layer function and a daemon. A daemon is a program that executes in the background ready to perform an operation when required. An abstraction layer function is a function used to handle requests directed towards hardware. This abstraction layer function allows the caller of the function to make a call without having to know about the specific hardware. Functioning like an extension to the operating system, a daemon is usually an unattended process that is initiated at startup or initialization of the data processing system. Typical daemons are print spoolers and e-mail handlers or a scheduler that starts up another process at a designated time.

Figure 4:
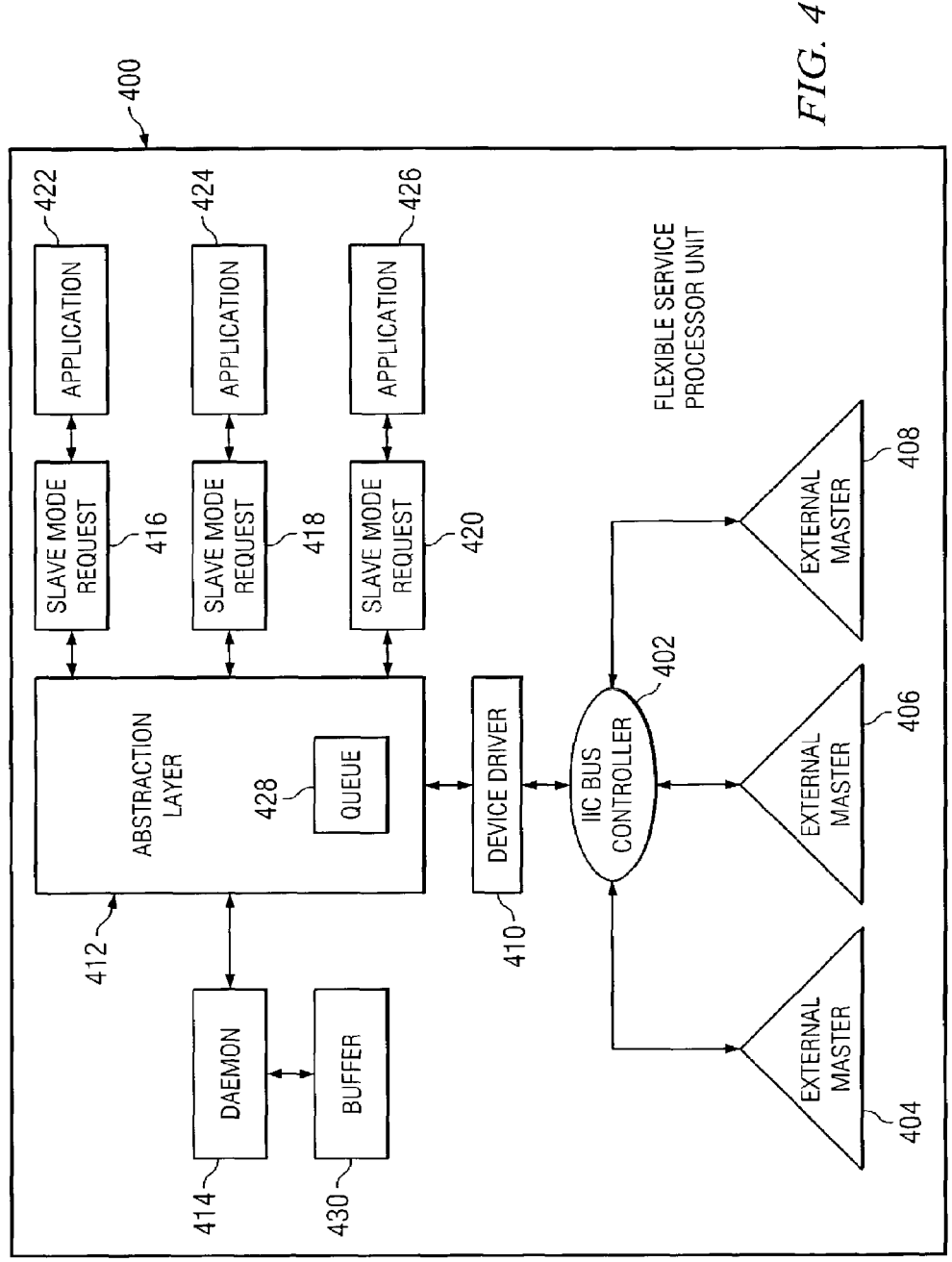
FIG. 4 is a diagram illustrating components in data flow used in virtualizing slaves in accordance with a preferred embodiment of the present invention.

With reference now to FIG. 4, a diagram illustrating components in data flow used in virtualizing slaves is depicted in accordance with a preferred embodiment of the present invention. In this example, flexible service processor unit 400 includes IIC bus controller 402, which serves to provide an interface to one or more IIC buses. In this example, external masters 404, 406, and 408 are attached to the same IIC bus.

Device driver 410 is set to listen to a predefined address as a slave for any activity occurring over the clock and data lines of the IIC bus. The mechanism of the present invention includes abstraction layer function 412 and daemon 414. In these examples, these two components are employed to create virtual slaves within flexible service processor unit 400. Abstraction layer function 412 receives slave requests from different processes. This abstraction layer performs a routing process to allow for virtualization of slaves in flexible service processor unit 400. In these examples, slave mode requests 416, 418, and 420 are sent from applications 422, 424, and 426. These requests are placed into queue 428 internal to abstraction layer function 412. Each entry into queue 428 includes an identification of the application. Other information may also be stored, such as the number of bytes of data expected by a particular application.

Daemon 414 is set up to monitor for data received by device driver 410. Daemon 414 reads data through abstraction layer 412 in these examples from device driver 410. This read is performed periodically, such as every N milliseconds. A suitable value for N may be identified for a system based on parameters, such as the controller memory and the speed at which the bus is operating. After initialization of flexible service processor unit 400, daemon 414 is present and runs as long as flexible service processor unit 400 is powered in these examples. All data received by device driver 410 is stored in buffer 430. The data is buffered by its arrival sequence and message boundary. Device driver 410 is set up or configured such that flexible service processor unit 400 is the slave. In other words, no change to device driver 410 is needed. Device driver 410 is configured to allow the flexible service processor to respond as a slave at a particular address. In the interrupt handler, as soon as the interrupt is serviced, the setup for next transfer is performed in such a manner that data is not lost. When the transfer in complete on the bus, and the data is received by the device driver 410, daemon 414 gathers the data, clears the registers, and sets the registers for the next transfer. Applications 422, 424, and 426 are the virtual slaves handled by abstraction layer function 412. When data is received in buffer 430, abstraction layer function 412 identifies all requests located in queue 428. The applications having requests in queue 428 are awakened and the data in buffer 430 is broadcast to the processes. In these examples, validation of data is handled by each respective application, rather than by abstraction layer function 412. If the data does not belong to a particular application, that application may generate another slave read request until the application receives the message that the application is waiting for from buffer 430.

In this manner, multiple external master devices can send messages to multiple virtual slaves in a flexible service processor even though the flexible service processor can only occupy a single slave address on the bus. In this manner, multiple virtual slaves may listen to a single slave address and loss of data is prevented in the instance in which multiple masters may send data to the single address.

Figure 5:
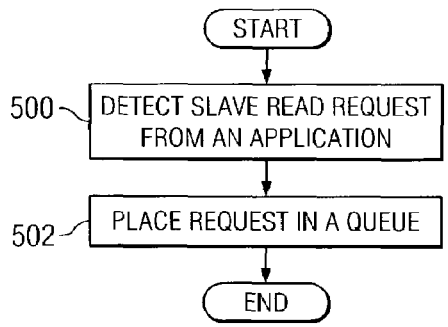
FIG. 5 is a flowchart of a process for handling slave read requests in accordance with a preferred embodiment of the present invention.

Turning now to FIG. 5, a flowchart of a process for handling slave read requests is depicted in accordance with a preferred embodiment of the present invention. The process illustrated in FIG. 5 may be implemented in a function, such as abstraction layer function 412 in FIG. 4.

The process begins by receiving a slave read request from an application (step 500). In these examples, the abstraction layer includes an external interface used by the applications for requests. Thereafter, the request is placed into a queue (step 502), with the process terminating thereafter. This queue is used to determine which applications are to receive the data when a broadcast occurs. Typically, the buffer will be checked for data whenever a request is made.

Figure 6:
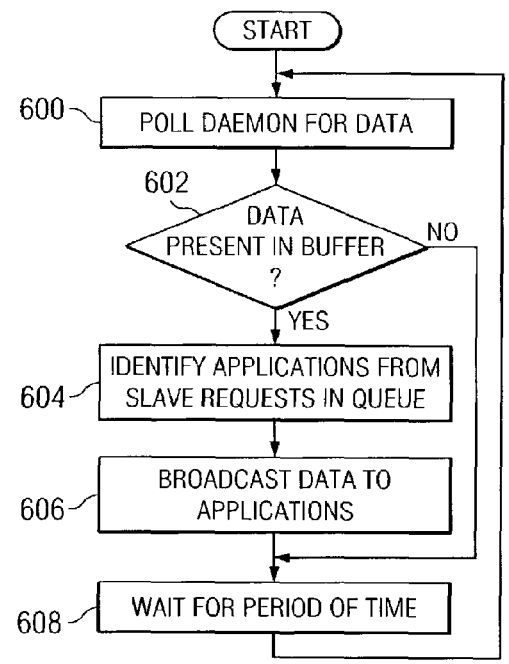
FIG. 6 is a flowchart of a process for identifying and transferring data to virtual slaves in accordance with a preferred embodiment of the present invention.

Turning next to FIG. 6, a flowchart of a process for identifying and transferring data to virtual slaves is depicted in accordance with a preferred embodiment of the present invention. The process illustrated in FIG. 6 may be implemented in a function, such as abstraction layer function 412 in FIG. 4.

The process begins by polling the daemon for data (step 600). A determination is then made as to whether data is present in the buffer (step 602). If data is present, applications are identified from slave requests in the queue (step 604). The data is then broadcast to the applications identified from the queue (step 606). Thereafter, the process waits for a period of time (step 608), and then returns to step 600 as described above. The process also proceeds to step 608 if no data is present in the buffer in step 602. Applications having requests in the queue are woken up with data being broadcast to all of the applications. The application can keep or discard the data received through the broadcast. In case the data is discarded, the application can place another request for new data. Alternatively, the daemon or abstraction layer may parse the data based on the identifier string and route the data to the appropriate request.

Figure 7:
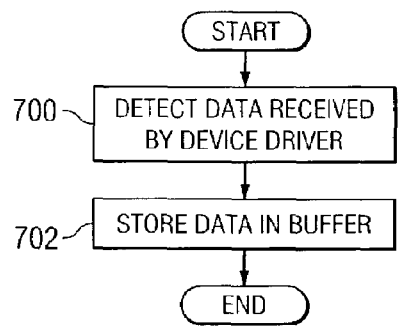
FIG. 7 is a flowchart of a process for handling data received by a device driver in accordance with a preferred embodiment of the present invention.

Turning next to FIG. 7, a flowchart of a process for handling data received by a device driver is depicted in accordance with a preferred embodiment of the present invention. The process illustrated in FIG. 7, may be implemented in a process such as daemon 414 in FIG. 4.

The process begins by detecting data received by the device driver (step 700). Next, the data is stored in a buffer (step 702), with the process terminating thereafter. This buffer is the one used by the abstraction layer function to send data to the different virtual slaves.

Thus, the present invention provides a method, apparatus, and computer instructions for handling multiple slave requests in a device, such as a flexible service processor. The mechanism of the present invention insures that the hardware is always configured to receive incoming data. The data is buffered and handled by a daemon process. Processes within the device may await for messages targeted for the flexible service processor. Messages are broadcast to these processes when data is received.

It is important to note that while the present invention has been described in the context of a fully functioning data processing system, those of ordinary skill in the art will appreciate that the processes of the present invention are capable of being distributed in the form of a computer readable medium of instructions and a variety of forms. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. For example, in the illustrations, a daemon and an abstraction layer function are used to implement the processes of the present invention. Depending on the particular implementation, these processes could be placed in a single component, such as in the abstraction layer function or in an entirely different component. Further, these processes could be implemented in more than two components depending on the particular implementation. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing requests for data by processes, the method comprising:
receiving, within a single physical device that is operating in slave mode, requests for data from a plurality of processes;
listening, by the single physical device having a single slave address, for data on a physical bus that is addressed to the single slave address, a plurality of master devices communicating with the single physical device using only the single slave address;
receiving, by a device driver that is included in the single physical device, data from the physical bus that is addressed to the single slave address;
storing data received by the device driver from ones of the plurality of master devices as stored data;
sending the stored data to the plurality of processes, wherein the device driver is not required to handle requests for the plurality of processes while the single physical device is operating in the slave mode;
in response to a receipt of data by the device driver, storing, using a daemon, the received data in a buffer to form the stored data;
in response to storing the received data in the buffer, resetting, by the daemon, the device driver so that the device driver is ready to start receiving new data, wherein, after receipt of data, the device driver does not process the data and remains continually ready to receive new data;
providing an abstraction layer within the single physical device;
receiving, by the abstraction layer, the requests for data from the plurality of processes;
placing the requests within a queue that is included in the abstraction layer, each one of the requests including an identification of one of the plurality of processes that made the request;
in response to the stored data being present in the buffer, identifying, by the abstraction layer, all of the requests that are in the queue;
identifying all of the plurality of processes that made the requests in the queue;
awakening, by the abstraction layer, all of the identified plurality of processes; and
broadcasting, by the abstraction layer, all of the stored data to all of the identified plurality of processes.

2. The method of claim 1, wherein the requests are slave read requests.

3. The method of claim 1, wherein the plurality of processes are virtual slaves.

* * * * *